(No Model.)
M. SCHULZE.
Belt Connection.
No. 238,443. Patented March 1, 1881.
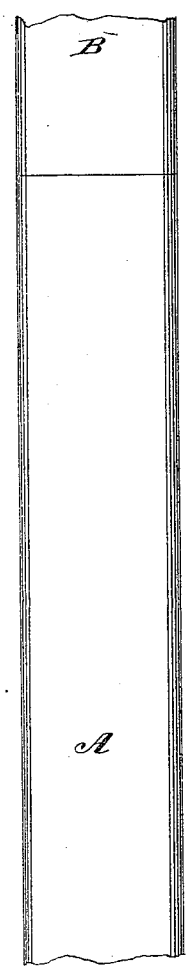
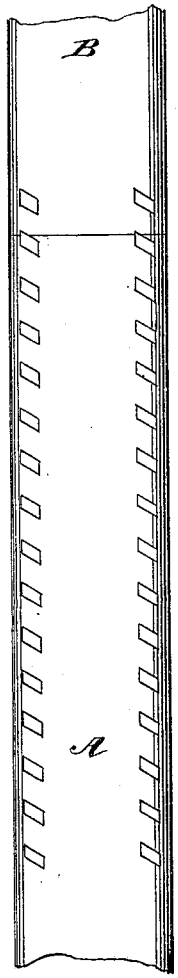
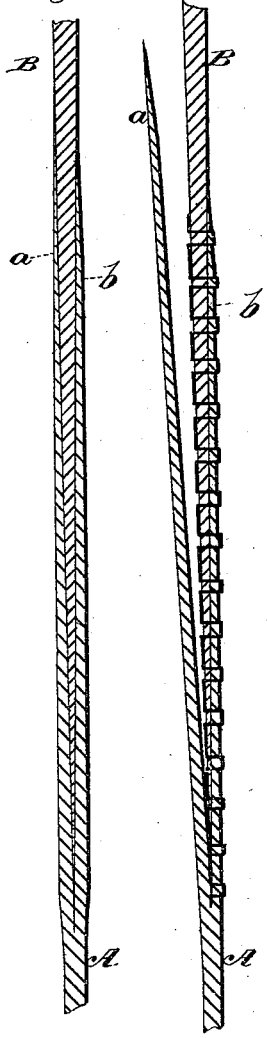
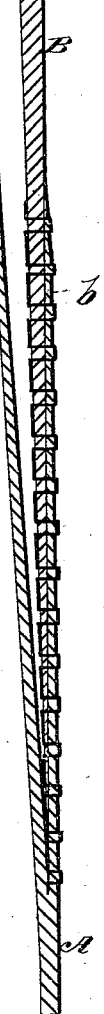
Witnesses.
Inventor.
Marie Schulze.
by James L. Norris
Atty.

UNITED STATES PATENT OFFICE.

MARIE SCHULZE, OF BERLIN, PRUSSIA, GERMANY.

BELT-CONNECTION.

SPECIFICATION forming part of Letters Patent No. 238,443, dated March 1, 1881.

Application filed January 20, 1881. (No model.)

*To all whom it may concern:*

Be it known that I, MARIE SCHULZE, a resident of the city of Berlin, Kingdom of Prussia, Germany, have invented a new and useful Improvement in Belt-Connections, of which the following is a specification, reference being had to the accompanying drawings.

This invention relates to the production of the seams or joins in driving-belts for machinery in such manner that the seams on the inner side or face thereof—that is to say, the side or face which is to be in contact with the pulleys—are covered, and consequently are not exposed to the wear and friction which have hitherto caused the separation of the parts or lengths of which such belts consist.

Hitherto the pieces or lengths of which such belts are made have been pared or beveled, the ends so prepared being laid together and sewed or laced by ordinary belt lacing or thongs.

According to my invention the parts or pieces which together are to form the driving-belt, or the two ends if the belt is made of one piece, are united by sewing in a particular manner, hereinafter described, so that, as hereinbefore stated, the seam is covered on the inner side or face.

In the accompanying drawings, Figure 1 represents the inner side or face of a portion of two parts or lengths of belting sewed together or united according to my improved method. Fig. 2 is a view of the upper or outer side or face of the same. Fig. 3 is a longitudinal section of a join or seam made according to my invention. Fig. 4 is a similar section, showing the stitching, the overlapping inner part being bent back.

In practicing this invention I proceed as follows—that is to say: One section or length, A, of the belt, (or one end of such belt if the same is made in one piece throughout,) instead of being pared or beveled in the usual manner, is slit or split for a part of its length, corresponding to the requisite length of seam, as will be readily understood by reference to Figs. 3 and 4 of the drawings, and the parts $a$ and $b$ so formed are pared off or beveled for a small part of their length. The part $a$, which is on the inner side or face of the belt, is left somewhat longer than the part $b$, on the outer side or face of the same. The other section or length, B, (or the other end of the belt,) which is to be joined to the first-named section, is pared off or beveled and inserted between the parts $a$ and $b$ so formed. It is glued to the upper part or flap, $b$, of the split section or end, and these parts are sewed together in the usual manner. The inner part or flap, $a$, is glued to the inner side of the part B, so that the inner surface of the belt, which is to be in contact with the pulley, is quite smooth or even.

By this novel manner of constructing driving-belts the frequent inconvenient slipping of the belts on the pulleys is obviated, and the seams or joins of such belts, being covered, are protected against friction and consequent wear, and thus the belts so made will be less liable to tear and their ends or sections to separate than is the case with belts manufactured by the ordinary methods.

What I claim is—

1. The method of uniting the ends of driving-belts for machinery, or of separate lengths or sections thereof, by splitting one end, and thus forming two flaps, between which a pared or beveled part of the other end or section to be united thereto is inserted and sewed to the upper or outer flap, the inner flap of the split end being then glued to the inner side of the inclosed end, as and for the purpose set forth, and as illustrated in the accompanying drawings.

2. A machine-driving belt the two ends or the separate sections whereof are united by inserting one end between two split portions of the opposite end and sewed to one portion and glued to the other in the manner above described, and as shown in the drawings.

This specification signed by me this 7th day of September, 1880.

MARIE SCHULZE.

Witnesses:
JOHANNES BREND,
FRANZ SCHULTZE.